(12) United States Patent  (10) Patent No.: US 9,175,805 B2
Conley et al.  (45) Date of Patent: Nov. 3, 2015

(54) LUBRICANT FILTRATION SYSTEM

(75) Inventors: Paul G. Conley, St. Charles, MO (US);
Canlong He, St. Peters, MO (US); Craig J. Fraser, Webster City, IA (US)

(73) Assignee: Lincoln Industrial Corporation, St. Louis, MO (US)

( * ) Notice: Subject to any disclaimer, the term of this patent is extended or adjusted under 35 U.S.C. 154(b) by 575 days.

(21) Appl. No.: 13/248,190

(22) Filed: Sep. 29, 2011

(65) Prior Publication Data
US 2013/0081983 A1  Apr. 4, 2013

(51) Int. Cl.
| *F16N 39/06* | (2006.01) |
| *B01D 35/147* | (2006.01) |
| *B01D 35/14* | (2006.01) |
| *B01D 35/143* | (2006.01) |

(52) U.S. Cl.
CPC .............. *F16N 39/06* (2013.01); *B01D 35/14* (2013.01); *B01D 35/143* (2013.01); *B01D 35/147* (2013.01); *B01D 35/1475* (2013.01); *Y10S 116/42* (2013.01)

(58) Field of Classification Search
None
See application file for complete search history.

(56) References Cited

U.S. PATENT DOCUMENTS

| 2,569,110 | A |   | 9/1951  | McGillis et al. |
| 3,011,470 | A | * | 12/1961 | Stoermer ..................... 116/268 |
| 4,186,975 | A |   | 2/1980  | Schwarz |
| 5,078,167 | A | * | 1/1992  | Brandt et al. ................. 137/549 |
| 5,098,168 | A |   | 3/1992  | Johnson |
| 5,150,975 | A |   | 9/1992  | Major |
| 5,178,405 | A |   | 1/1993  | Brandstadter |
| 5,492,393 | A |   | 2/1996  | Peisker |
| 5,492,416 | A |   | 2/1996  | Gabelli |
| 5,595,152 | A |   | 1/1997  | Selby et al. |
| 5,685,331 | A |   | 11/1997 | Westermeyer |
| 5,850,849 | A |   | 12/1998 | Wood |
| 6,024,417 | A |   | 2/2000  | Jones, II |
| 6,387,261 | B1 |  | 5/2002  | Mojena |
| 6,886,589 | B2 |  | 5/2005  | Oretti |
| 7,182,855 | B1 | * | 2/2007  | O'Leary ........................ 210/90 |
| 7,384,197 | B2 |  | 6/2008  | Plona |

(Continued)

FOREIGN PATENT DOCUMENTS

| CN | 1984704 A | 6/2007 |
| GB | 926007 | 5/1963 |

OTHER PUBLICATIONS

Graco, Red Alert Filters, Instructions-Parts List 307-252, copyright 1976, 4 pages.

(Continued)

*Primary Examiner* — Katherine Zalasky
*Assistant Examiner* — Kara Graber
(74) *Attorney, Agent, or Firm* — Senniger Powers LLP

(57) ABSTRACT

A filtration device is disclosed. The device includes a filter inlet, a filter outlet, and a filter flow path from the filter inlet to the filter outlet. A filter in the filter flow path filters contaminants from lubricant flowing from a lubricant supply to a lubricant destination. A bypass flow path bypasses the filter in the event the filter becomes clogged. The bypass flow path has a bypass inlet in fluid communication with the filter flow path at a location upstream from the filter and a bypass outlet separate from the filter outlet and not in fluid communication with the filter outlet. The bypass outlet is normally closed to permit flow along the filter flow path and opens if the filter becomes clogged so that lubricant is directed along the bypass flow path and through the bypass outlet for disposal without going to the lubricant destination.

11 Claims, 15 Drawing Sheets

(56) References Cited

U.S. PATENT DOCUMENTS

| | | |
|---|---|---|
| 7,789,567 B2 | 9/2010 | Giesler |
| 2005/0284802 A1 | 12/2005 | Jankuski et al. |
| 2007/0056888 A1* | 3/2007 | Williams et al. ............. 210/90 |
| 2007/0289994 A1 | 12/2007 | Kotyk |
| 2008/0053879 A1* | 3/2008 | Harris ........................ 210/90 |
| 2008/0257027 A1* | 10/2008 | Wu ........................... 73/146.8 |
| 2009/0211963 A1 | 8/2009 | Murray |
| 2009/0324151 A1 | 12/2009 | Craig |
| 2010/0270242 A1 | 10/2010 | Paradise |

OTHER PUBLICATIONS

Hydac, High Pressure Filters, DF Series, undated, 4 pages (admitted prior art).
International Search Report dated Nov. 30, 2012 for Application No. PCT/US2012/056845; 2 pages.
Written Opinion dated Nov. 30, 2012 for Application No. PCT/US2012/056845: 5 pages.
Chinese Office Action in corresponding Chinese Application No. 201280052170.3, dated Jan. 26, 2015.

* cited by examiner

LUBRICANT FILTRATION SYSTEM

FIELD OF THE INVENTION

The present invention generally relates to equipment for delivering lubricant (e.g., grease or oil) to a lubrication destination (e.g., a bearing), and in particular to systems for filtering contaminants from such lubricant.

BACKGROUND OF THE INVENTION

Lubricant such as grease attracts and captures contaminants such as metal shavings, dirt, etc. Without filtration, lubrication performance can be significantly degraded. Further, contaminants in the lubricant can enter the equipment being lubricated and cause damage. Components of the lubrication system itself can also be damaged. In either case, costly machine downtime can result. Filtration systems are designed to remove the contaminants. However, conventional filters suffer several drawbacks. When the filters become clogged, lubricant is either blocked from reaching the lubrication destination, which can cause substantial damage to the equipment needing the lubricant, or bypassed around the filter and delivered, unfiltered, to the lubrication destination, which can cause the contamination problems discussed above. Further, conventional lubrication systems often fail to provide adequate warning of the need for filter replacement before the filter reaches a condition where it is substantially non-functional due to clogging.

There is, therefore, a need for an improved lubricant filtration system.

SUMMARY OF THE INVENTION

This invention is directed to a filtration device comprising a filter inlet adapted for fluid communication with a lubricant supply, a filter outlet adapted for fluid communication with a lubricant destination at which a lubrication event occurs, and a filter flow path from the filter inlet to the filter outlet. A filter in the filter flow path filters contaminants from lubricant flowing from the lubricant supply to the lubricant destination. A bypass flow path bypasses the filter in the event the filter becomes clogged. The bypass flow path has a bypass inlet in fluid communication with the filter flow path at a location upstream from the filter and a bypass outlet separate from the filter outlet and not in fluid communication with the filter outlet. The bypass outlet is normally closed to permit flow along the filter flow path and is adapted to open in the event the filter becomes clogged whereby lubricant is directed along the bypass flow path and through the bypass outlet for disposal without going to the lubricant destination.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
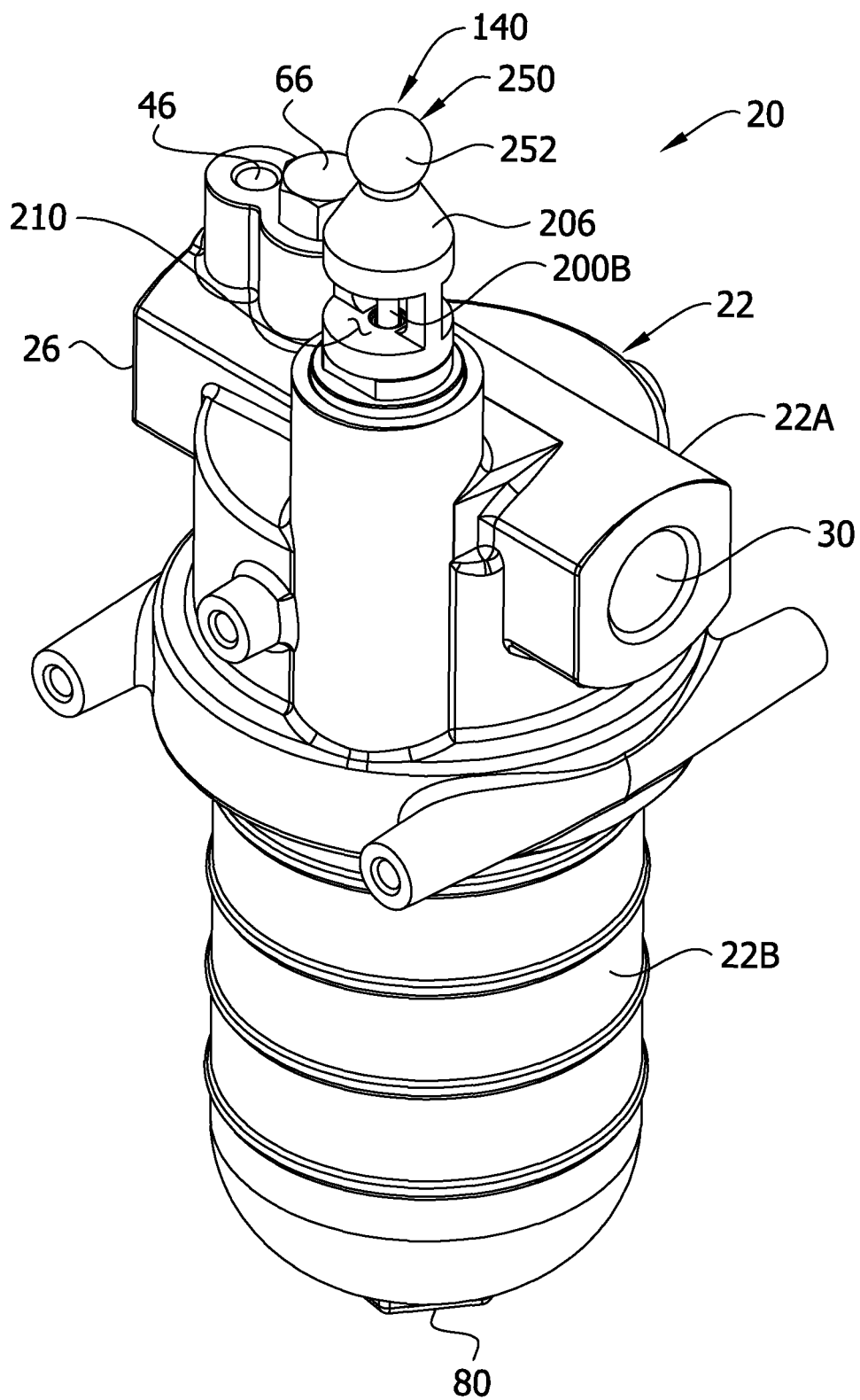
FIG. 1 is a perspective of a filtration device of this invention.

FIGS. 1-4 illustrate one embodiment of a filtration device of this invention, generally designated 20. The device comprises a housing, generally indicated at 22, having a head portion 22A that includes a filter inlet 26 adapted for fluid communication with a lubricant supply (not shown), a filter outlet 30 adapted for fluid communication with a lubricant destination (e.g., a bearing, not shown) at which a lubrication event occurs. The housing also includes a body portion 22B that houses a filter 32 for filtering contaminants from lubricant flowing from the lubricant supply to the lubricant destination. Desirably, in this embodiment, the body portion 22B of the housing 22 is separable from the head portion 22A for replacing the filter. The housing 22 defines a filter flow path 34 from the filter inlet 26 to the filter outlet 30 for flow of lubricant through the filter, as will be described.

Figure 6:
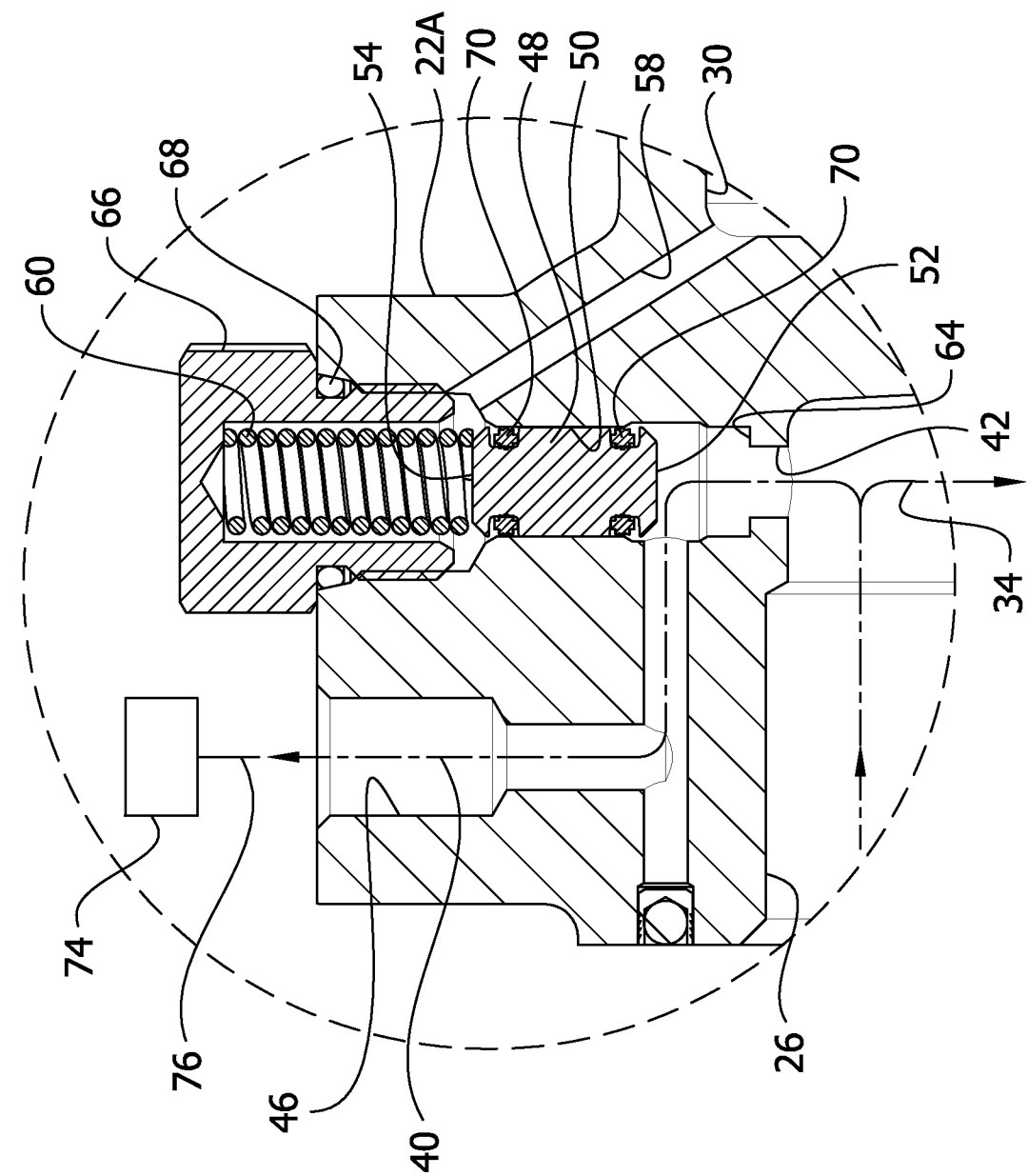
FIG. 6 is view similar to FIG. 5 showing the bypass valve in its open position.

Referring to FIG. 6, the head portion 22A of the housing 22 also defines a bypass flow path 40 for bypassing the filter 32 in the event the filter becomes clogged. The bypass flow path 40 has a bypass inlet 42 in fluid (lubricant) communication with the filter flow path 34 at a location upstream from the filter 32 and a bypass outlet 46 separate from the filter outlet and not in fluid (lubricant) communication with the filter outlet. The bypass outlet 46 is normally closed to permit flow along the filter flow path 34 and is adapted to open in the event the filter 32 becomes clogged such that lubricant is directed along the bypass flow path 40 and through the bypass outlet for disposal without going to the lubricant destination. As a result, contamination of the equipment being lubricated at the lubrication destination is avoided.

Figure 5:
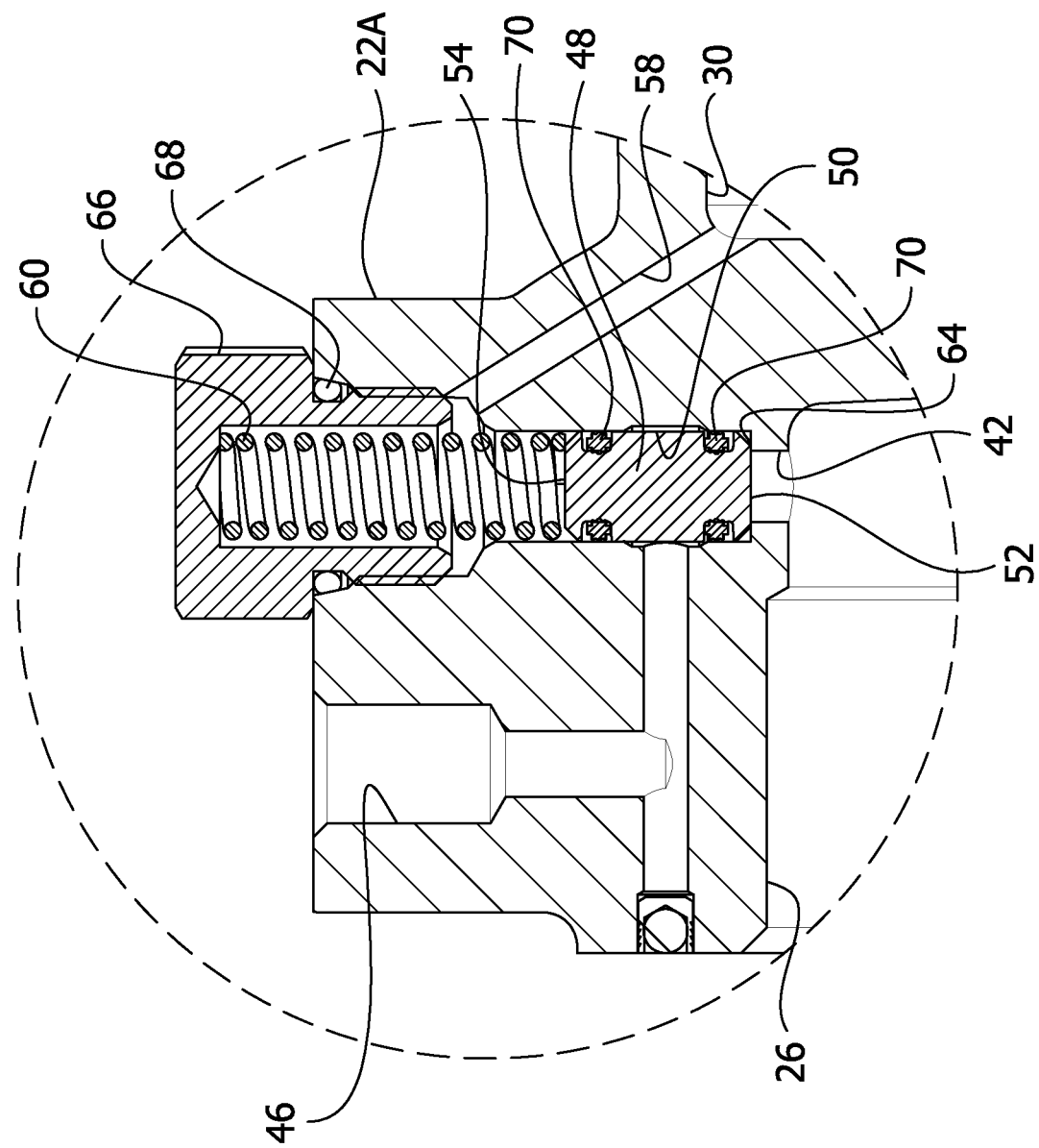
FIG. 5 is an enlarged portion of FIG. 5 showing a bypass valve in its closed position.

In particular, a normally-closed bypass valve 48 (FIGS. 5 and 6) is disposed for sliding movement in a valve bore 50 communicating with the bypass flow path 40. The bypass valve has a first end 52 exposed to fluid pressure at the filter inlet 26 and a second end 54 exposed to fluid pressure at the filter outlet 30 via a pressure-sensing passage 58 not in fluid (lubricant) communication with the filter inlet. The bypass valve 48 is biased by a spring 60 toward a closed position in which the valve seals against a valve seat 64 in the bypass flow path 40 (FIG. 5). The spring 60 reacts against an insert 66 threaded into the head portion 22A of the housing 22 and sealed with respect to the housing by a ring seal 68. The bypass valve 48 is movable to an open position (FIG. 6) against the bias of the spring when the pressure differential across the valve, corresponding to the pressure differential between the filter inlet 26 and filter outlet 30, reaches a predetermined bypass pressure differential (e.g., at least about 300 psi; and desirably at least about 400 psi). Seals 70 around the periphery of the valve 48 seal against the wall of the valve bore 50 and block fluid (lubricant) communication between the filter inlet 26 and the filter outlet 30.

The bypass flow path 40 and bypass valve 48 may have other configurations.

Desirably, a collection vessel 74 (illustrated schematically in FIG. 6) is in fluid communication with the bypass outlet 46 for collecting unfiltered lubricant for disposal. The collection vessel 74, if used, may be connected to the housing 22 by a suitable conduit 76 or other means. The collection vessel may be a tank or other receptacle.

Figure 2:
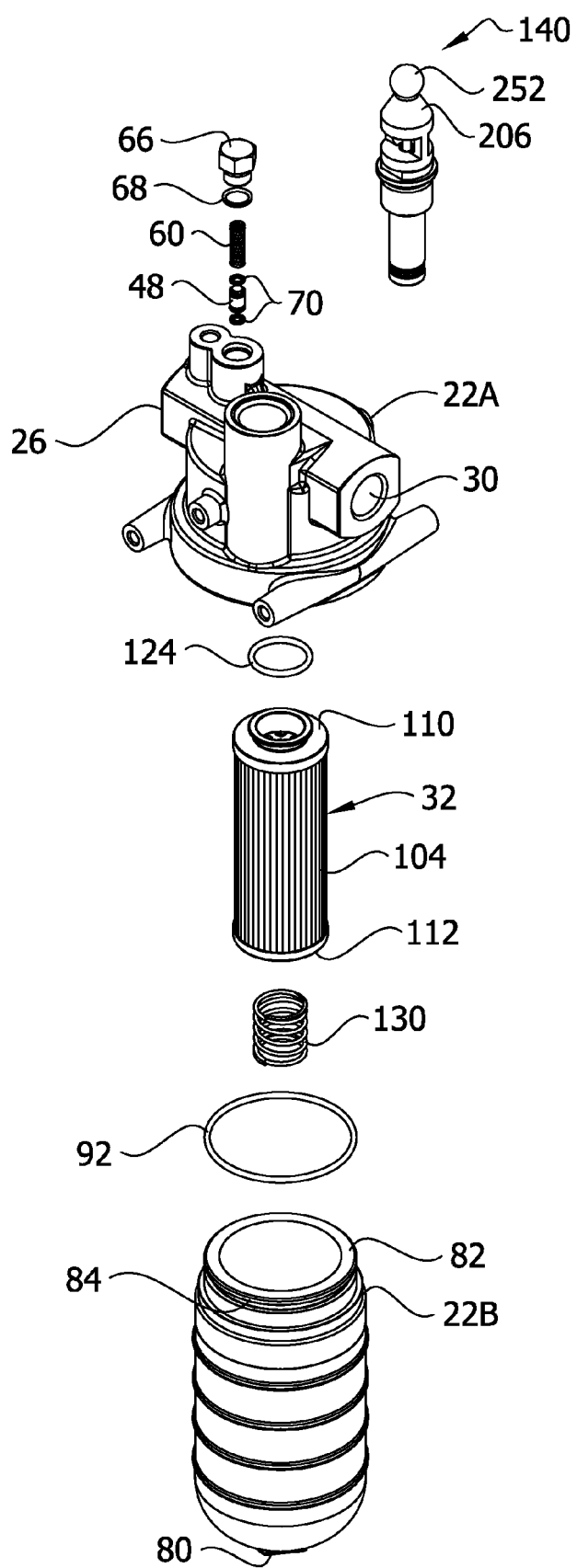
FIG. 2 is an exploded perspective of the filtration device.
Figure 3:
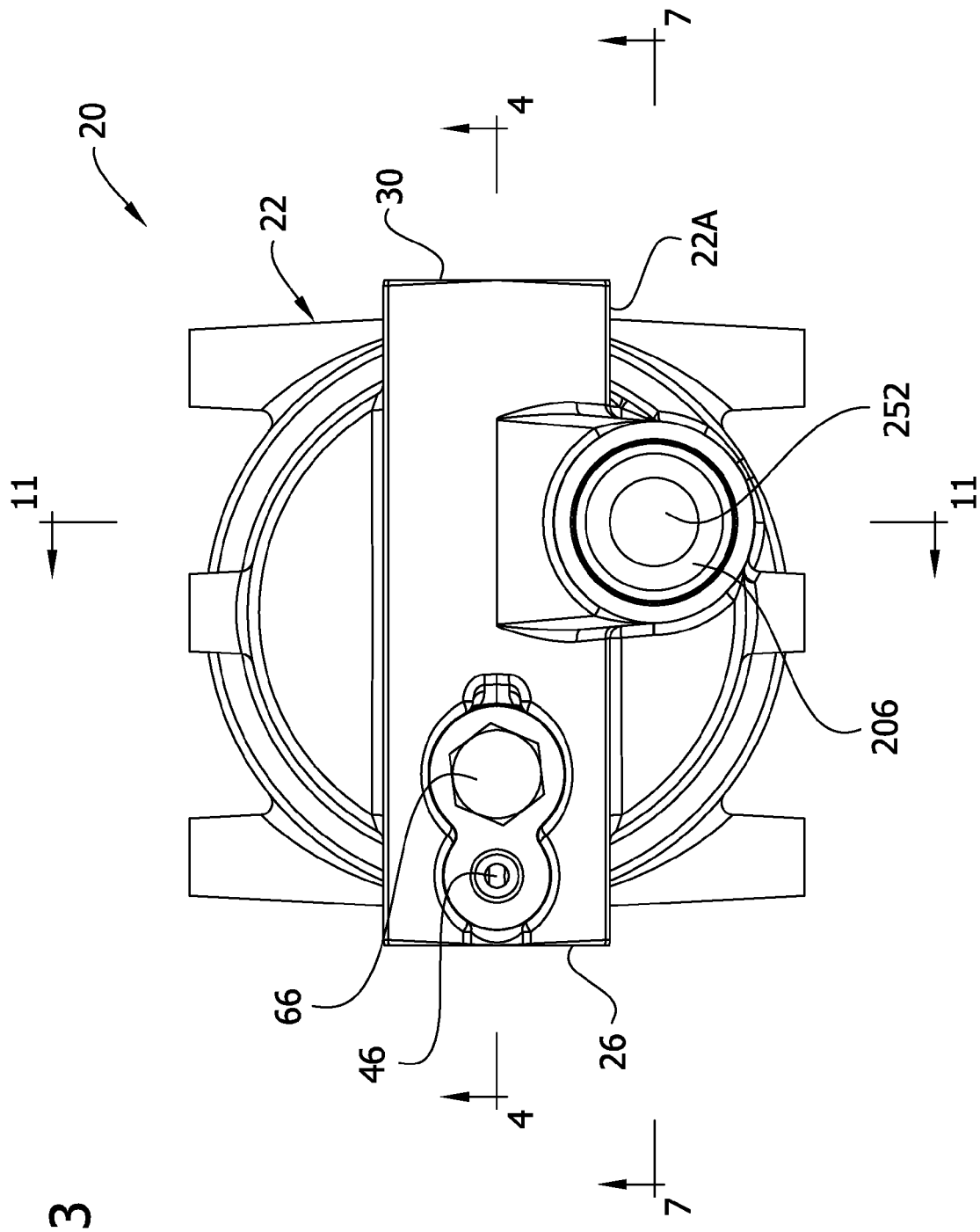
FIG. 3 is top view of the filtration device.
Figure 4:
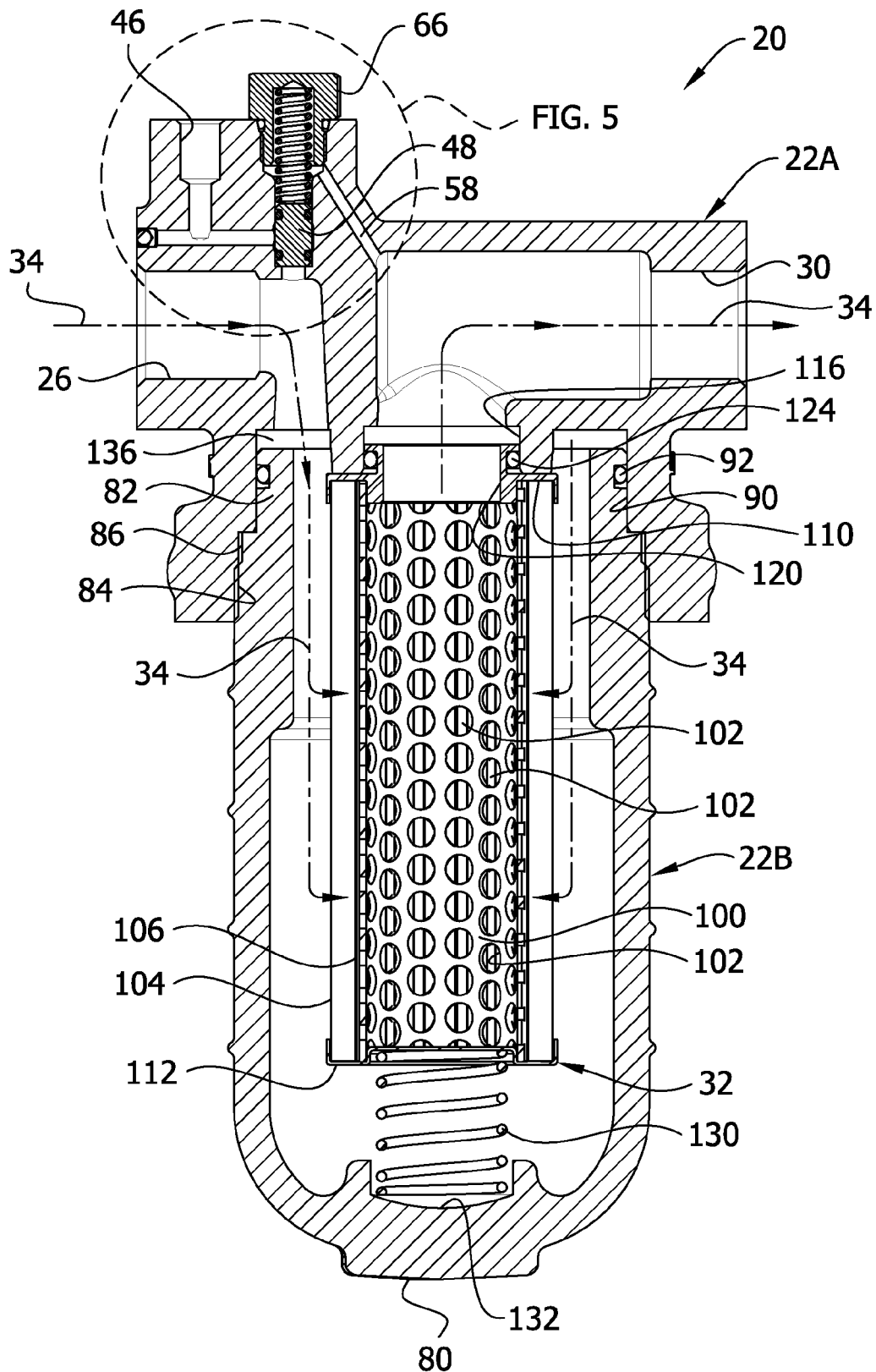
FIG. 4 is a vertical section taken in the plane of 4-4 of FIG. 3.

Referring to FIGS. 2 and 4, the body portion 22B of the housing 22 enclosing the filter 32 is elongate and hollow, having a closed lower end 80, an upper end 82, and external threads 84 that mate with internal threads 86 circumscribing an opening 90 in the head portion 22A of the housing 22. A seal 92 around the upper end 82 of the body portion 22B seals against the wall defining the opening 90 in the head portion 22B of the housing.

The filter 32 itself is an assembly comprising a rigid substantially cylindrical support 100 (FIG. 4) perforated with holes 102 for the passage of lubricant, a cylindrical filter screen 104 concentric with the support fitted on the outside of the support for filtering larger-size contaminants, and a cylindrical filter element 106 disposed between the screen 104 and the support 100 for filtering smaller-size contaminants. By way of example only, the filter element 106 may comprise a 500-μm wire mesh filter element. The filter support 100 is sufficiently strong to avoid being crushed at pressure differentials less than the pressure differential at which the bypass valve 48 opens. In one exemplary embodiment, the filter support 100 is of 0.060 in.-thick cold-rolled steel having a yield strength of about 41,000 psi. The support has an ID of about 1.27 in., an axial length of about 4.9 in., and the holes 102 have a diameter of about 0.203 in. and are arrayed on about 0.25 in. centers. Other constructions are possible.

The filter 32 also includes upper and lower substantially rigid end caps 110, 112. The lower end cap 112 is solid across its surface and blocks the flow of fluid. The upper end cap 110 is annular in shape and is received in an opening 116 defined by the head portion 22A of the housing 22. The annular shape of the upper end cap 110 defines a central opening 120 in fluid (lubricant) communication with the filter outlet 30. A seal 124 around the upper end cap 110 seals against the wall defining the opening 116 in which the upper end cap is received. The filter 32 is biased upwardly to an installed position in sealing engagement with the head portion 22A of the housing (FIG. 4) by a spring 130 reacting at its lower end against a spring seat 132 at the lower end 80 of the housing body 22B and at its upper end against the lower end cap 112 of the filter assembly 32. Other filter arrangements are possible.

Referring again to FIG. 4, lubricant entering the filter inlet 26 flows along the filter flow path 34 into an annular space 136 between the filter and the body portion of the housing. From there, it flows through the filter screen 104, filter element 106, and the holes 102 in the filter support 100, and then up through the opening 120 in the upper end cap 110 to the filter outlet 30. Other flow path configurations may be used without departing from the scope of this invention.

The filtration device 20 of this embodiment also includes an indicating device, generally designated 140, movable to provide a visual indication in the event the pressure differential across the filter (i.e., the differential between the filter inlet 26 and the filter outlet 30) reaches a predetermined clog-warning pressure differential less than (e.g., 50 psi less than) the stated predetermined bypass pressure differential.

Figure 8:
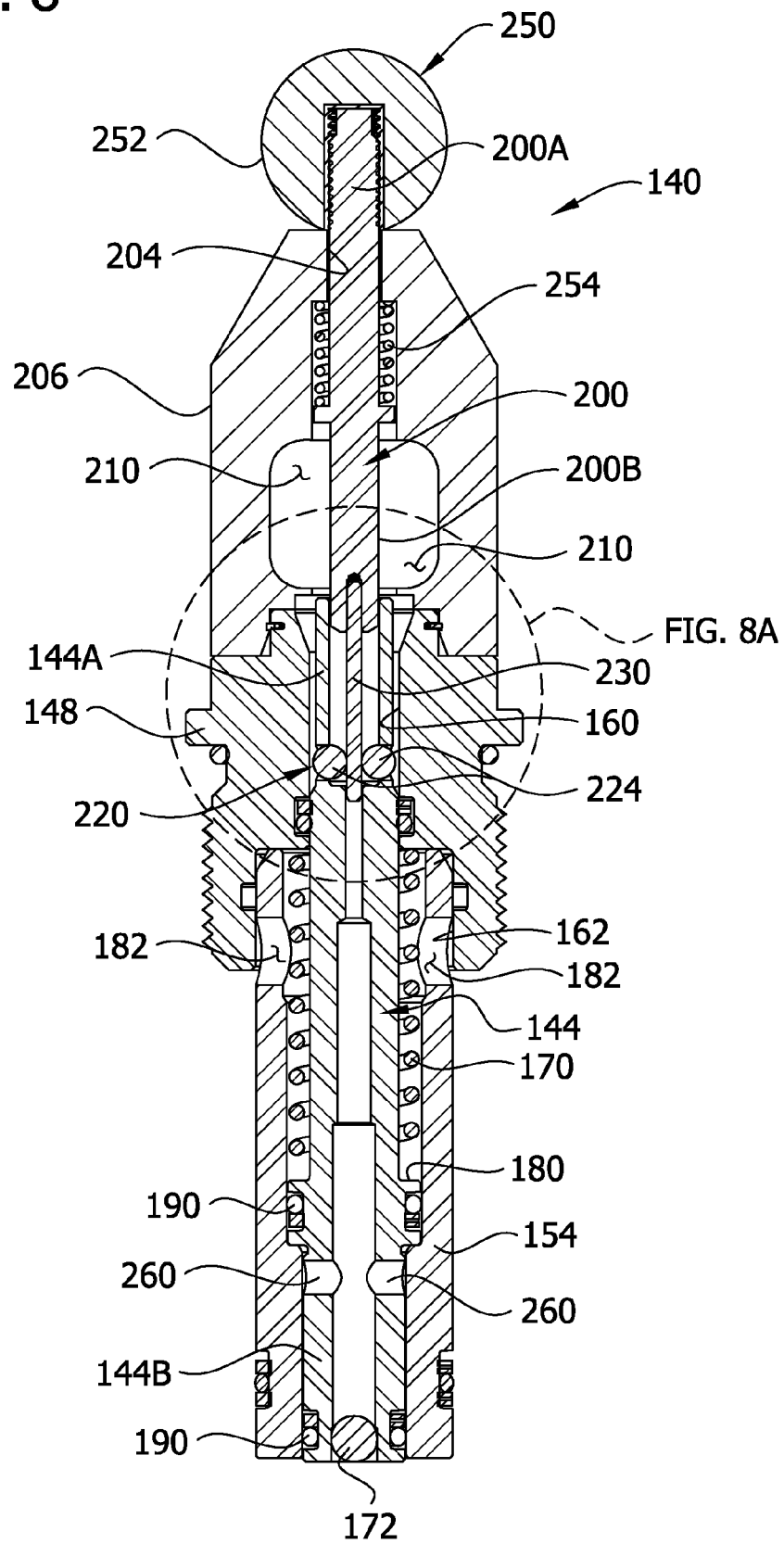
FIG. 8 is an enlarged portion of FIG. 7 showing an indicating device with its component parts indicating that the filter is not clogged.
Figure 8A:
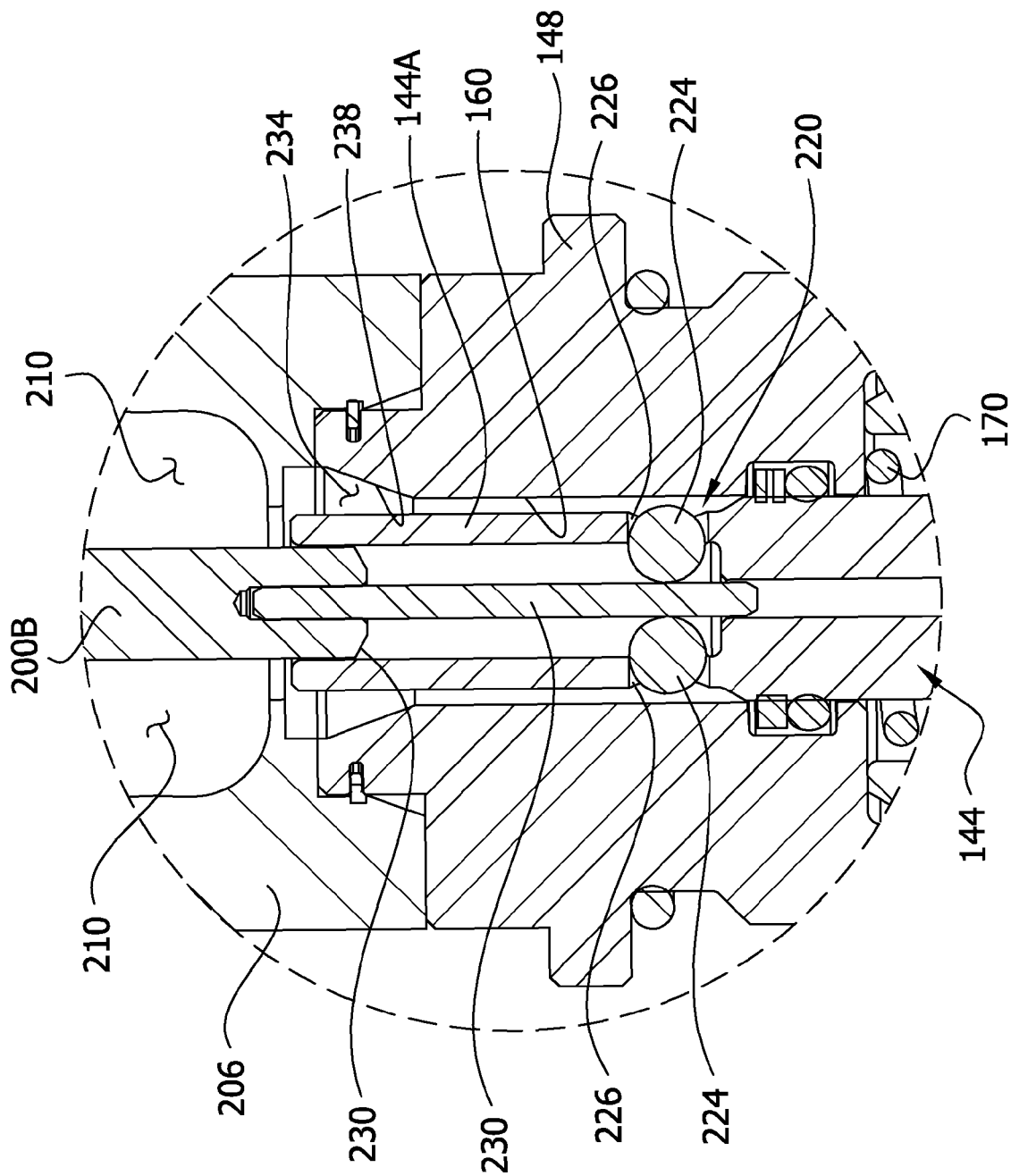
FIG. 8A is an enlarged portion of FIG. 8.
Figure 9:
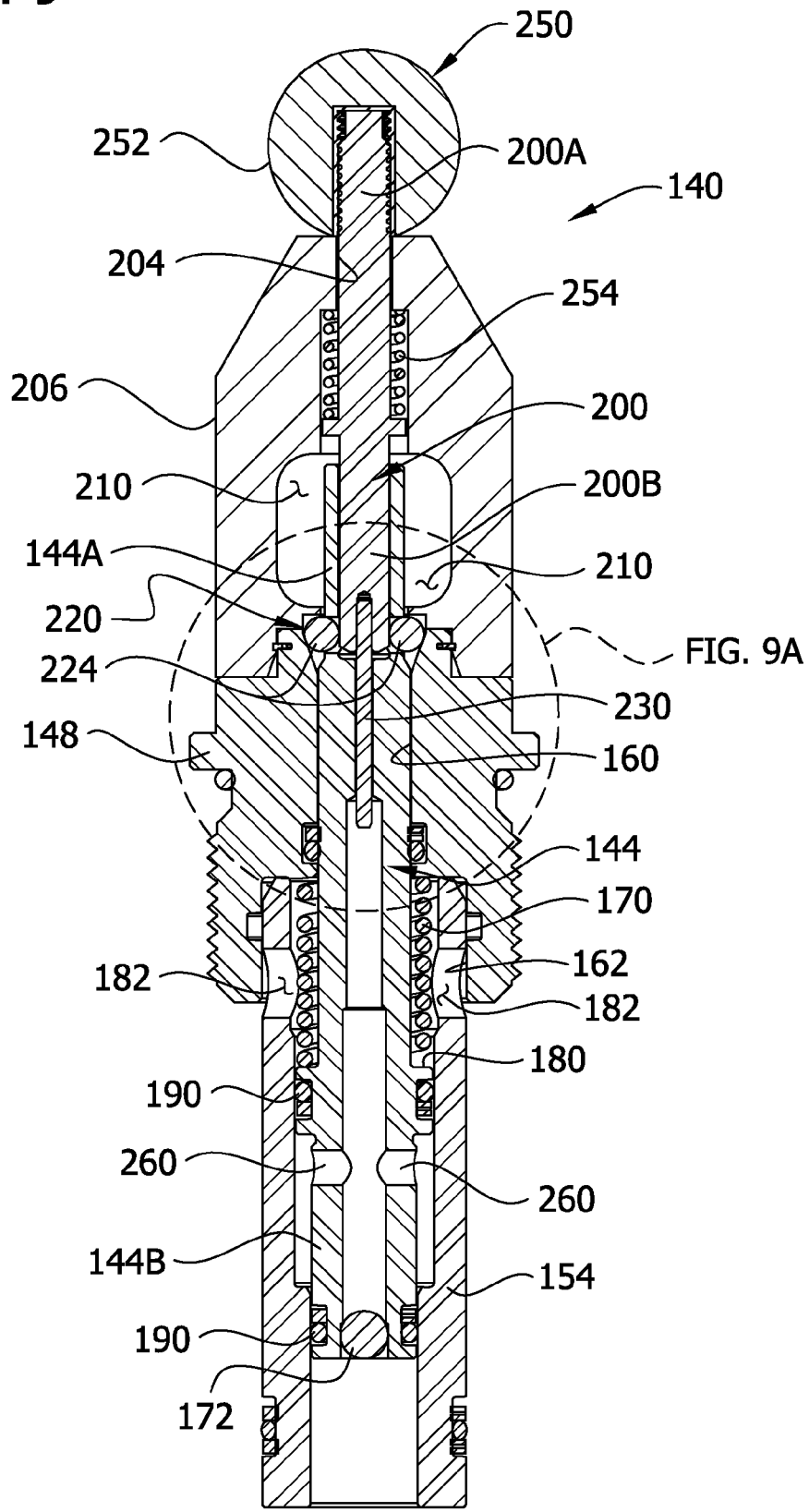
FIG. 9 is a view similar to FIG. 8 showing the indicating device with its component parts indicating that the filter is clogged.
Figure 9A:
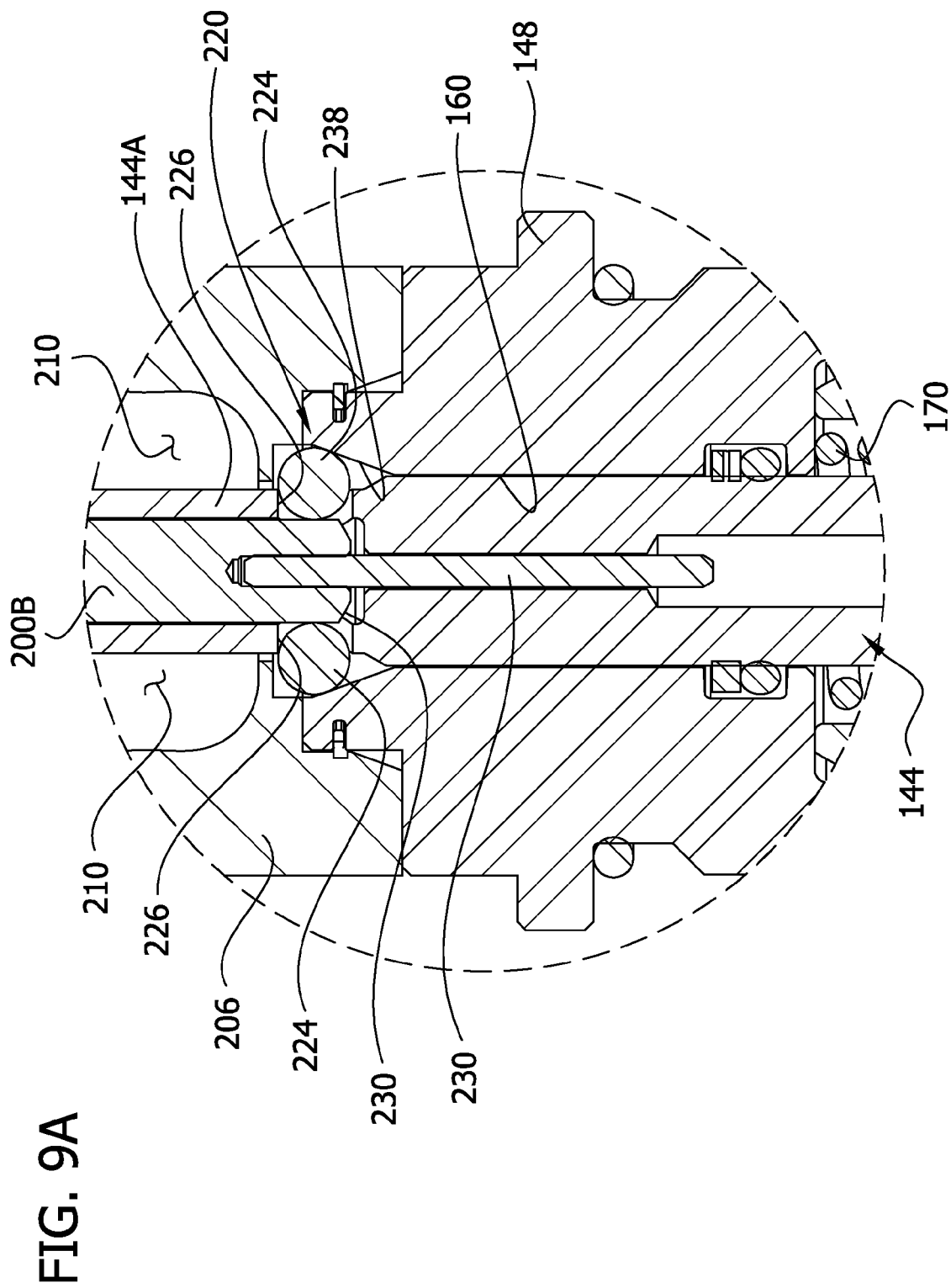
FIG. 9A is an enlarged portion of FIG. 9.

Referring to FIGS. 8 and 8A, the indicating device 140 comprises a first indicator part 144 for indicating that the filter is partially or fully clogged. As will be described, the first indicator part is movable from an obscured position (FIGS. 8 and 8A) in which it is not visible to an un-obscured position (FIGS. 9 and 9A) in which it is visible when the pressure differential across the filter reaches the stated predetermined clog-warning pressure differential.

Figure 7:
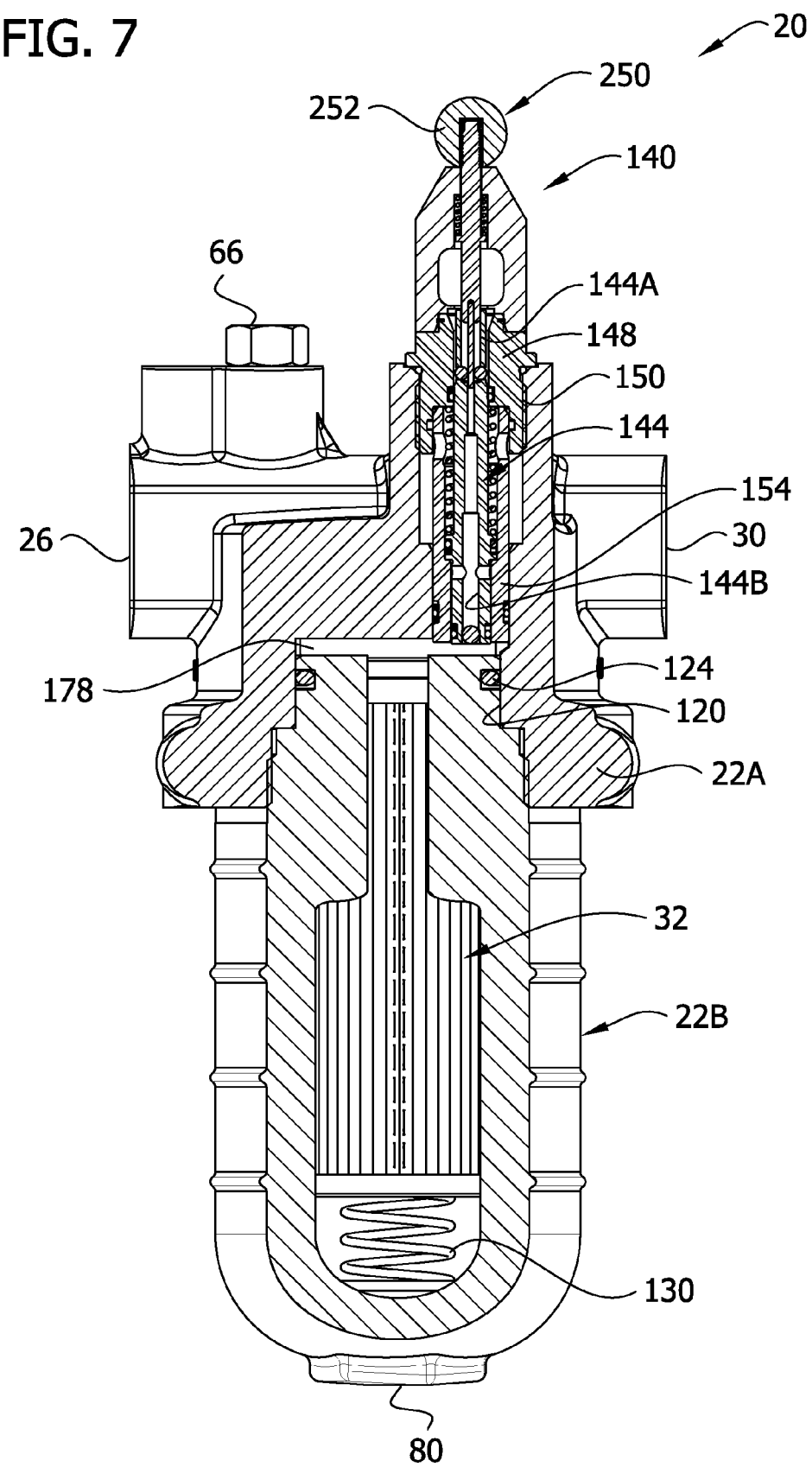
FIG. 7 is a vertical section taken in the plane of 7-7 of FIG. 3.

Referring still to FIGS. 7, 8, and 8A, the indicating device is an assembly of parts comprising an insert 148 threaded in an opening 150 in the head portion 22A of the housing 22, and a tubular guide 154 co-axial with the opening 150 for guiding the first indicator part 144 between its obscured and un-obscured positions. The threaded insert 148 has a central longitudinal bore 160 that receives an upper end 144A of the first indicator part 144, and a counterbore 162 at the lower end of the central bore 160 that receives an upper end of the tubular guide 154. In the illustrated embodiment, the first indicator part 144 comprises a first elongate member in the form of an indicator sleeve (also designated 144) having an upper (or, more broadly, outer) portion 144A and a lower (or, more broadly, inner) portion 144B. The upper portion 144A of the indicator sleeve 144 is marked by color (e.g., red) or otherwise marked or configured to indicate that the filter is clogged and needs maintenance (e.g., replacement). The upper portion 144A of the sleeve 144 is normally retracted inside the bore 160 of the insert 148 and is thus normally not visible.

Figure 11:
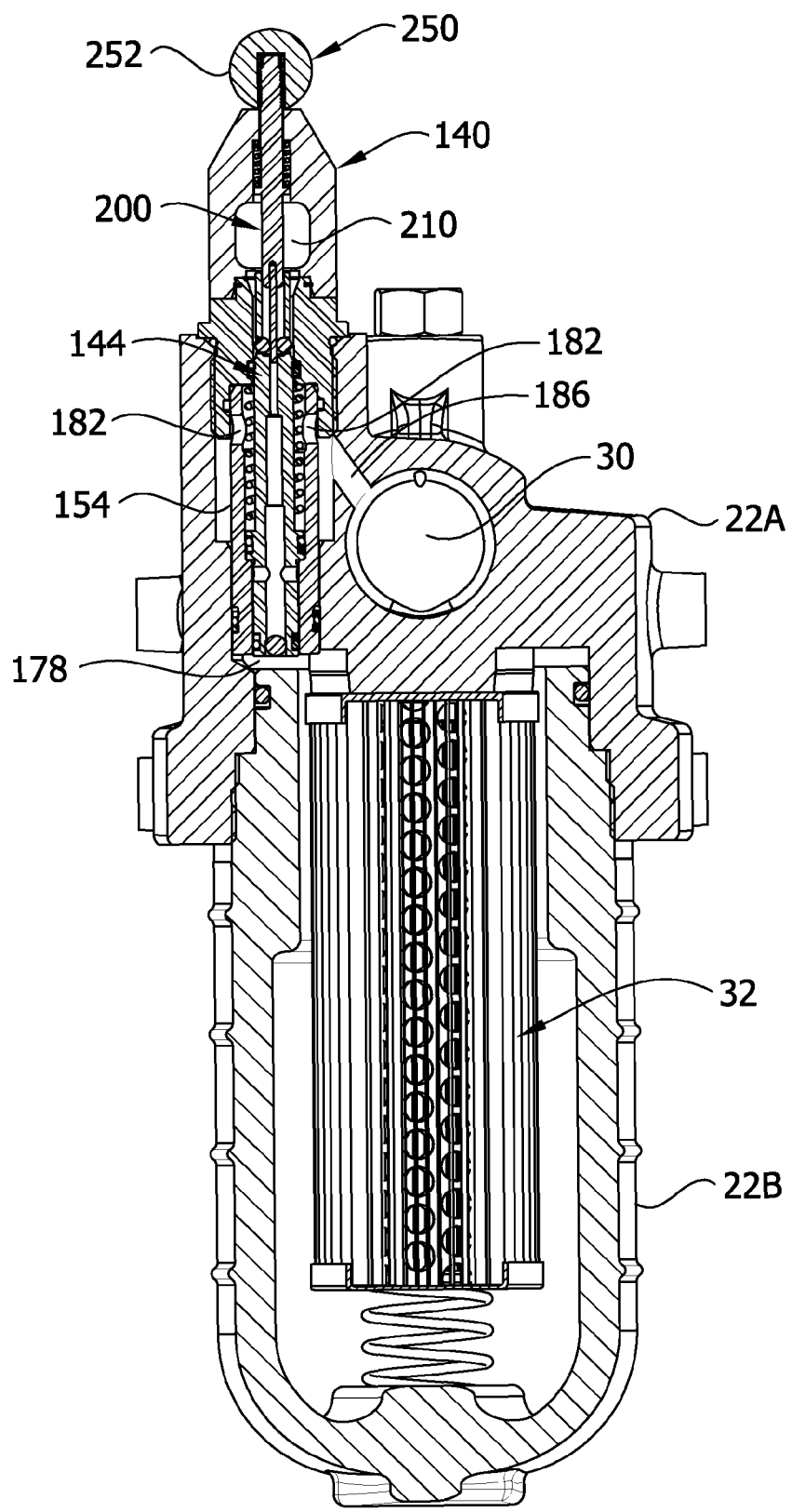
FIG. 11 is a vertical section taken in the plane of 11-11 of FIG. 3.
Figure 12:
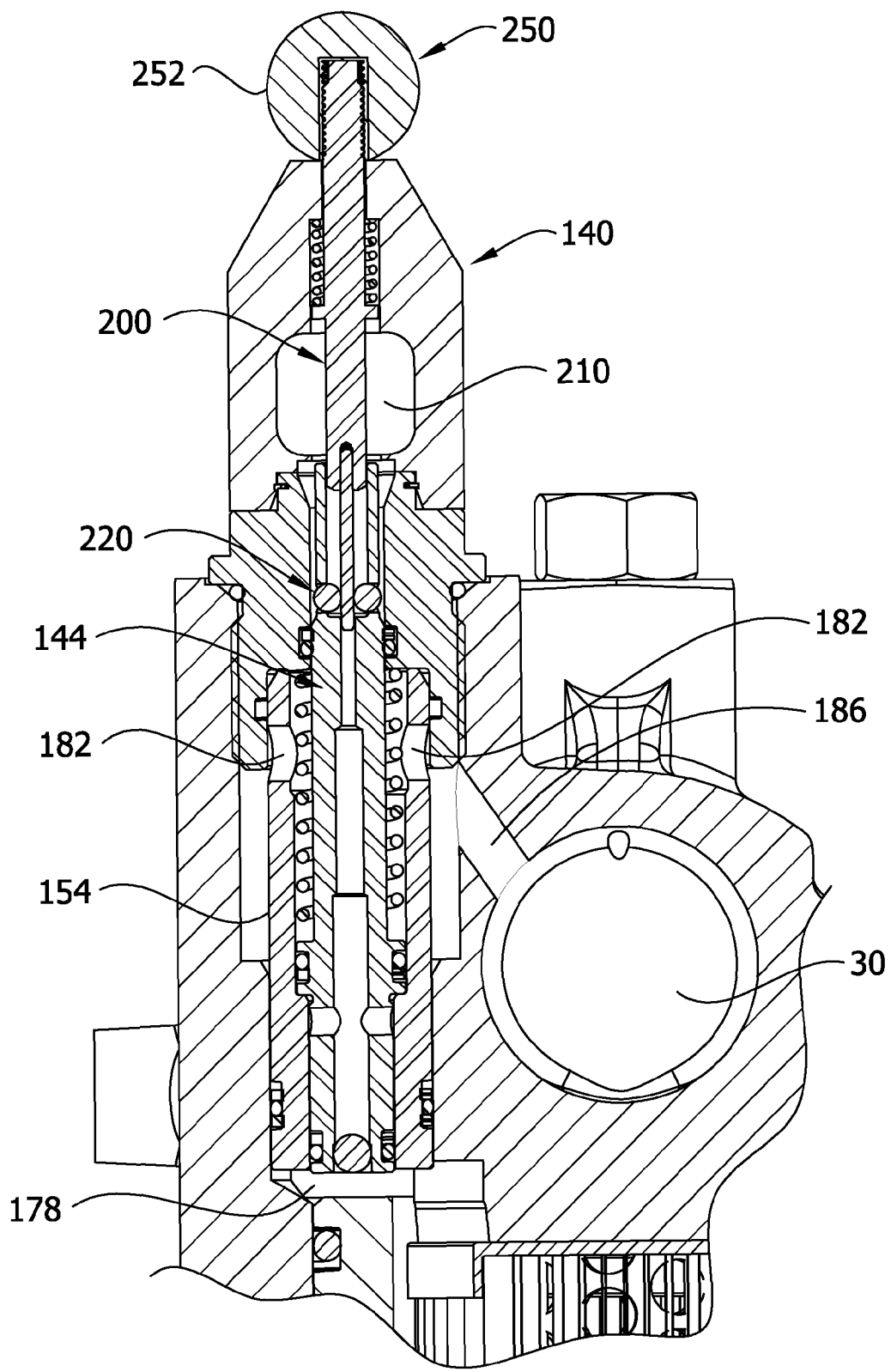
FIG. 12 is an enlarged portion of FIG. 11.

The indicator sleeve 144 is biased by a spring 170 toward the obscured position shown in FIGS. 8 and 8A in which the upper portion 144A of the sleeve 144 is retracted inside the bore 160 of the insert 148 and thus obscured from view. The lower end portion 144B of the indicator sleeve 144 has a sliding fit in the guide 154. The lower end of the sleeve 144 is closed, as by a plug 172, and is exposed to fluid (lubricant) pressure at the filter inlet 26 via a cavity 178 best illustrated in FIG. 7. A flange 180 (FIG. 8) on the exterior of the sleeve 144 is exposed to fluid (lubricant) pressure at the filter outlet 30 via holes 182 in the guide and a pressure-sensing passage 186 in the head portion 22A of the housing 22 (see FIG. 11). Seals 190 around the periphery of the lower portion of the sleeve 144B below the flange 180 seal against the guide 154 so that the pressure-sensing passage 186 is not in fluid (lubricant) communication with the filter inlet 26.

As illustrated in FIG. 8, the indicating device 140 also includes a second indicator part comprising a second elongate member in the form of a pin 200 having an upper (or, more broadly, outer) portion 200A and a lower (or, more broadly, inner) portion 200B. The upper portion 200A of the pin 200 has a sliding fit in a bore 204 in a cap 206 attached to the threaded insert 148. The lower portion 200B of the pin 200 is normally visible through one or more windows 210 in the cap 206. Optionally, the lower portion 200B of the pin 200 is marked by color (e.g., green) or otherwise to indicate that the filter 32 is not clogged.

The arrangement is such that when the pressure differential across the filter 32 (i.e., the pressure differential between the filter inlet 26 and filter outlet 30) reaches the stated predetermined clog-warning pressure, the indicator sleeve 144 moves upward against the bias of the spring 170 from its obscured position (FIGS. 8 and 8A) in which visibility of the upper portion 144A of the sleeve 144 through the window(s) 210 of the cap 206 is obscured, to its un-obscured position (FIGS. 9 and 9A) in which the upper portion of the sleeve is visible through the window(s) of the cap, thereby providing a visual indication or warning that the filter 32 is clogged. The lower portion 200B of the indicator pin 200 is received in the upper portion 144A of the sleeve 144 and obscured from view through the window(s) 210.

The filtration device 20 includes an automatic locking device, generally designated 220, for automatically locking the first indicator part (the indicator sleeve 144) in its un-obscured (FIGS. 9 and 9A) position. The locking device 220 comprises at least one and desirably two detent members 224 (balls). When the indicator sleeve is in its obscured position (FIGS. 8 and 8A), these balls 224 are received and centered in two respective holes 226 in the sleeve 144. Movement of the detent members 224 in an outward radial direction away from their centered positions is blocked by the cylindrical wall of the central bore 160 in the threaded insert 148. Movement of the detent members 224 in an inward radial direction away from their centered positions is blocked by a spacer rod 230 that is attached to the indicator pin 200 and extends down between the two detent members. Upward movement of the indicator sleeve 144 toward its un-obscured position (FIGS. 9 and 9A) causes the detent members 224 to engage a tapered lower end surface 230 on the pin 200. This engagement forces the detent members 224 laterally outward from their respective centered positions in holes 226 into an enlarged section 234 of the bore 160 in the insert (see FIG. 9A). In their over-center positions, the detent members 224 are wedged between the sleeve 144 and a tapered (e.g., conical) wall 238 defining the enlarged section 234 of the bore 160. As a result, the sleeve 144 is locked against downward movement toward its obscured (FIG. 8) position, thus insuring that the indicator sleeve 144 remains in its raised (un-obscured) position warning of a clogged filter until certain reset steps are taken, as described below. The automatic locking device 220 may have other constructions without departing from the scope of this invention.

Figure 10:
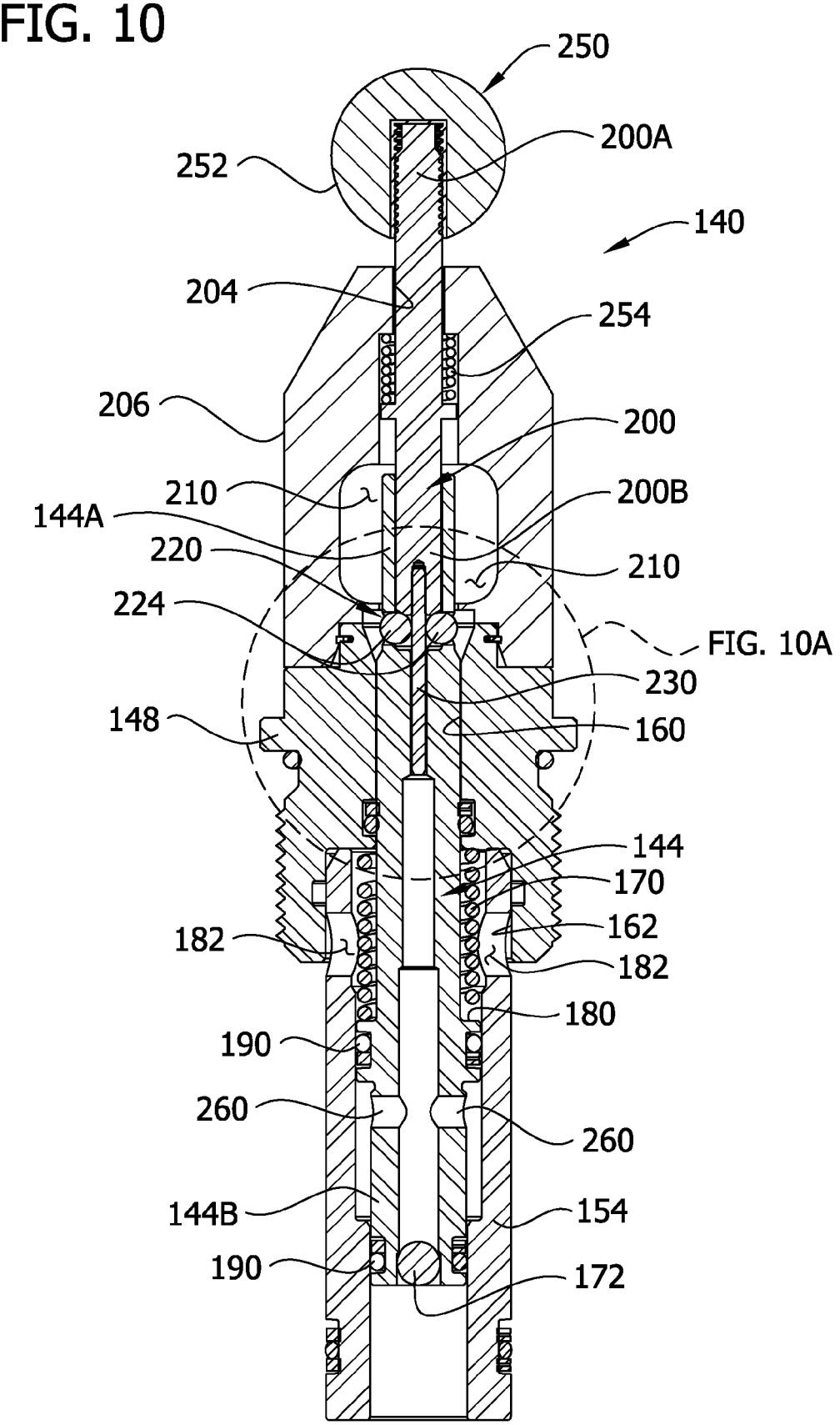
FIG. 10 is view similar to FIG. 8 showing the indicating device with its component parts in a reset position.
Figure 10A:
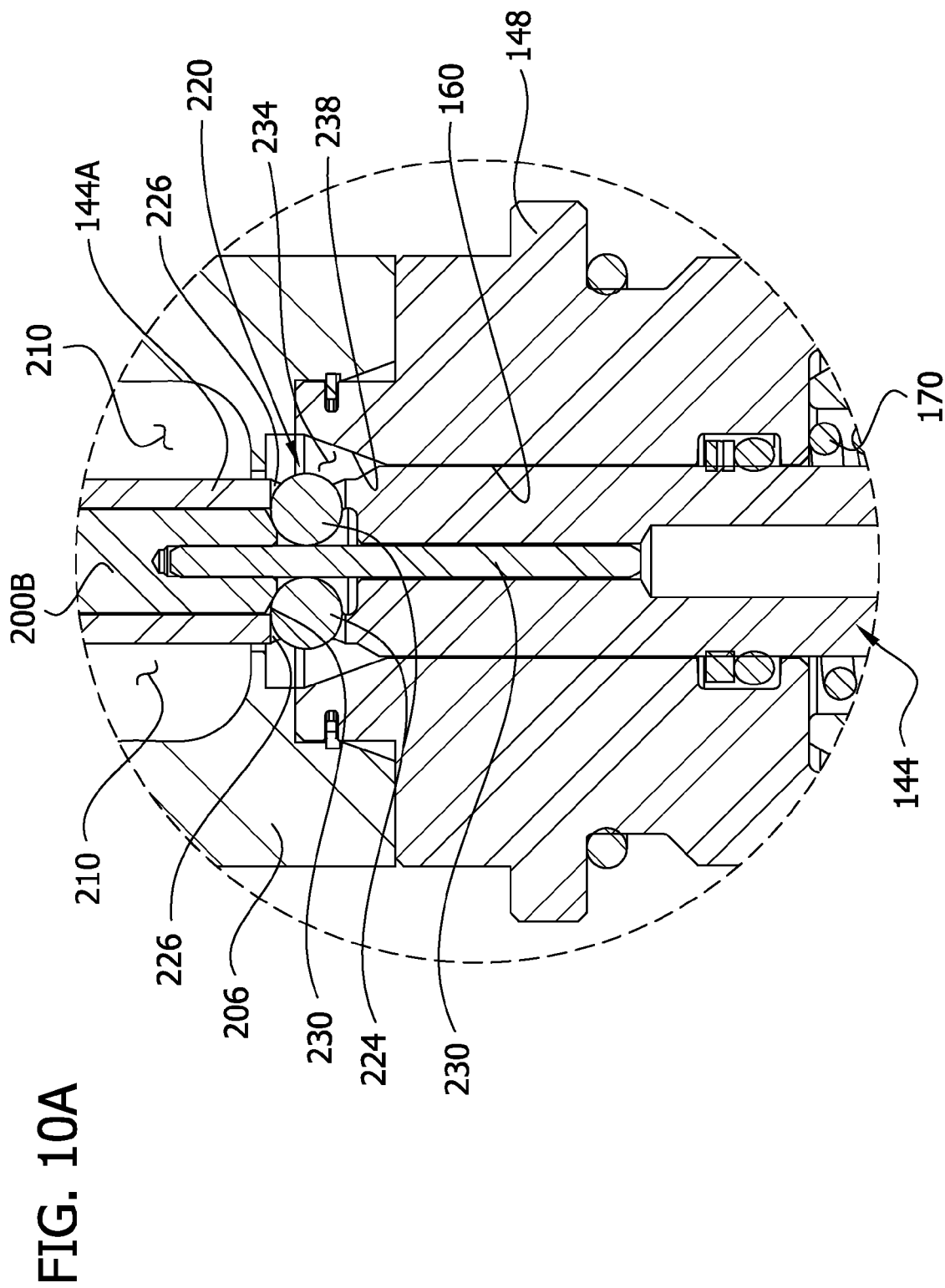
FIG. 10A is an enlarged portion of FIG. 10.

A reset device, generally designated 250, is provided for releasing the locking device 220 to allow the indicator sleeve 144 to move back to its obscured position under the bias of the spring 170. The reset device 250 is used after the filter 32 has been cleaned or replaced with a new filter. In this embodiment, the reset device 250 comprises a knob 252 (e.g., a round ball) attached to the upper portion 200A of the pin 200. The knob 252 is configured for being grasped and pulled to exert an upward (or, more broadly, outward) force on the pin to move it upward against the bias of a spring 254 to a reset position (FIGS. 10 and 10A) in which the detent members 224 are able to roll along the tapered surface 238 from their over-center positions back to their centered positions in respective holes 226 in the sleeve 144. With the detent members 224 centered in their respective holes 226, the sleeve 144 moves under the urging of the spring 170 back to its obscured position. The knob 252 is then released to allow the pin 200 to move under the bias of the spring 254 back to its normal (FIGS. 8 and 8A) position in which the lower portion 200B of the pin 200 is visible through the window(s) 210 in the cap 206. As previously mentioned, the lower pin portion 200B may be marked or otherwise configured to indicate that the filter in the housing 22 is not clogged. The reset device 250 may have other constructions without departing from the scope of this invention.

Holes 260 in the lower portion 144B of the indicator sleeve 144 communicate with atmosphere to facilitate movement of the sleeve 144 relative to the guide 154 and the threaded insert 148.

The indicating device 140 may have other constructions without departing from the scope of this invention. Alternatively, the indicating device may be eliminated from the filtration device 20.

It will be observed from the foregoing that the filtration device 20 has many advantages. If the filter 32 becomes clogged, unfiltered lubricant is not delivered to the lubrication destination, thereby avoiding contamination of the equipment. Unfiltered lubricant is easy to collect. Further, a clear visual indication is provided as to the status of the filtering device, that is, whether the filter is clogged or unclogged. If the filter becomes clogged, it can easily be replaced simply by separating the head and body portions 22A, 22B of the filter housing, cleaning or replacing the clogged filter 32, and re-connecting the two housing portions. The status-indicating device 140 is easily reset after a clogged filter has been cleaned or replaced. The filtration device is also capable of either horizontal or vertical mounting. The filtration device can also be used at high pressures, e.g., up to 5000 psi, and for lubricant having relatively high viscosity, e.g., 35,000 centistokes.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A filtration device, comprising
a filter inlet adapted for fluid communication with a lubricant supply,
a filter outlet adapted for fluid communication with a lubricant destination at which a lubrication event occurs,
a filter flow path from the filter inlet to the filter outlet,
a filter in the filter flow path for filtering contaminants from lubricant flowing from the lubricant supply to the lubricant destination,
a bypass flow path for bypassing the filter in an event the filter becomes clogged, said bypass flow path having a bypass inlet in fluid communication with the filter flow path at a location upstream from the filter and a bypass outlet separate from the filter outlet,
a normally-closed bypass valve in said bypass flow path configured to open when a pressure differential across the filter reaches a predetermined bypass pressure differential, said bypass valve being normally closed to permit flow along said filter flow path and being adapted to open in the event the filter becomes clogged whereby lubricant is directed along the bypass flow path and through the bypass outlet for disposal without going to said lubricant destination,
an indicating device movable to provide a visual indication in an event the pressure differential across the filter reaches a predetermined clog-warning pressure differential less than said predetermined bypass pressure differential, said indicating device comprising a first indicator part movable from an obscured position, in which said first indicator part is not visible, to an un-obscured position, in which the first indicator part is visible when the pressure differential across the filter reaches said predetermined clog-warning pressure differential, said first indicator part including a sleeve marked to indicate that the filter is clogged, and a housing having a head portion that includes the filter inlet, the filter outlet, the bypass inlet, and the bypass outlet, and a body portion that houses the filter, the head portion having a bore for removably receiving the indicating device, wherein the indicating device further comprises
- a guide received in said bore for guiding the first indicator part between the obscured and un-obscured positions,
- a cap outside the head portion of the housing, the cap having a window through which said first indicator part is visible in the un-obscured position,
- a second indicator part indicating that the filter is not clogged, said first indicator part being movable relative to the second indicator part, and
- a pin that is visible through the window when the first indicator part is in the obscured position and that is covered by the sleeve when the first indicator part is in the un-obscured position.

2. The filtration device of claim 1, wherein said bypass valve has a first end exposed to fluid pressure at the filter inlet and a second end exposed to fluid pressure at the filter outlet via a pressure-sensing passage.

3. The filtration device of claim 1, further comprising a collection vessel in fluid communication with the bypass outlet for collecting unfiltered lubricant for disposal.

4. The filtration device of claim 1, further comprising the body portion being separable from the head portion for maintenance of the filter.

5. The filtration device of claim 4, further comprising a spring for urging the filter into sealing engagement with the head portion of the housing.

6. The filtration device of claim 1, wherein the first indicator part is exposed to pressure at the filter inlet and to pressure at the filter outlet via a pressure-sensing passage.

7. The filtration device of claim 1, wherein the first indicator part in the un-obscured position covers the second indicator part and obscures it.

8. The filtration device of claim 1, further comprising an automatic locking device for automatically locking the first indicator part in the un-obscured position.

9. The filtration device of claim 8, further comprising a reset device for releasing the automatic locking device, and a spring urging the first indicator part from the un-obscured position back toward the obscured position.

10. The filtration device of claim 1, further comprising an automatic locking device for automatically locking the sleeve in the un-obscured position.

11. The filtration device of claim 10, further comprising a reset device for releasing the automatic locking device, and a spring urging the sleeve from the un-obscured position toward the obscured position, said reset device comprising a reset member for moving the pin relative to the sleeve to release the automatic locking device.

* * * * *